United States Patent Office 3,322,772
Patented May 30, 1967

3,322,772
PROCESS FOR THE PRODUCTION OF
CARBOXYLIC ESTERS
Shigeo Togashi, 555 Miyamacho, Funabashishi, Chiba-ken, Japan, and Hiroshi Yamada, 329 Okamotocho, Setagayaku, Tokyo, Japan
No Drawing. Filed Dec. 23, 1963, Ser. No. 332,883
Claims priority, application Japan, Dec. 28, 1962, 37/59,106; June 25, 1963, 38/33,349; Sept. 11, 1963, 38/47,917, 38/47,918; Sept. 12, 1963, 38/48,025
11 Claims. (Cl. 260—287)

The present invention relates to an improved process for the production of carboxylic acid esters by using, as the raw materials, the corresponding carboxylic acids or the anhydrides thereof and alcohols. More particularly, the invention relates to a process for producing the esters of aliphatic, aromatic or heterocyclic carboxylic acids by the reaction of the carboxylic acids or the anhydrides thereof with alcohols in the presence of a catalyst such as, an inorganic acid, an organic acid, or an ion-exchange resin with the addition of a peroxide.

Hitherto, as a process for the production of carboxylic acid esters, there have been known various processes. These processes, however, have in general required an excessive amount of alcohols to raw material carboxylic acids. Further, there is also known a process wherein in order to remove water formed during the esterification another component that can form an azeotropic mixture with water is added to the reaction system and a process wherein a small amount of a material such as an inorganic acid having a catalytic action together with an action of dehydrating thus formed water is added to the reaction system. However, these processes are also insufficient in the points of the formation rate of the ester and of the yields, and therefore are unsatisfactory for industrial purposes.

The inventors have found that when a peroxide is added to a reaction system in a known esterification by heating a mixture of an aliphatic, aromatic, or heterocyclic carboxylic acid or the anhydride thereof and an alcohol under the presence of a catalyst, such as, an inorganic acid, organic acid or cation-exchange resin, the corresponding carboxylic ester acid can be produced in an extremely short time with a good yield as compared with known processes.

That is, in accordance with the process of this invention, by adding a peroxide to a reaction system in a known esterification process in which an aliphatic, aromatic, or heterocyclic carboxylic acid or the anhydride is caused to react with an alcohol under the presence of a catalyst selected from an inorganic acid, organic acid, or ion-exchange resin by heating, the reaction time can be reduced from 1/10 to 1/30 of that in the known processes and also the necessary amount of the alcohol to the carboxylic acid feed can be reduced from 1/2 to 1/10 of that in the known processes. By the process of this invention, the desired esters of aliphatic, aromatic, and heterocyclic carboxylic acids can be produced extremely easily and with a good yield.

As aliphatic carboxylic acid used in the process of this invention, there are formic acid, acetic acid, propionic acid, butyric acid, valerianic acid, caporic acid, caprylic acid, lauric acid, myristic acid, palmitic acid, stearic acid, and other aliphatic carboxylic acid that can be esterified. The aliphatic carboxylic acid may have a substituent such as an aromatic ring or a heterocyclic ring as the case may be. As the aromatic carboxylic acids, there are monocyclic and polycyclic aromatic carboxylic acids such as having a benzene ring, naphthalene ring, phenanthrene ring, etc., which may have a substituent as the case may be. For example, benzoic acid, phthalic acid or anhydride, toluic acid and salicylic acid may be mentioned. As the heterocyclic carboxylic acids, there are given the esterifiable carboxylic acids of monocyclic or polycyclic heterocyclic compounds of nitrogen, oxygen, sulfur, etc., which may have a substituent as the case may be.

As the alcohols, there are primary alcohols, such as, methyl alcohol, ethyl alcohol, and butyl alcohol; secondary alcohols, such as, isopropyl alcohol and isoamyl alcohol; tertiary alcohols, such as, t-butyl alcohol and t-amyl alcohol; polyhydric alcohols, such as ethylene glycol and glycerol; and aromatic, and heterocyclic alcohols, such as, phenols, benzyl alcohol, phenylethyl alcohol, furfuryl alcohol and tetrahydrofurfuryl alcohol. These alcohols may have other substituents further.

As the catalyst, known esterification catalysts can be used, for example, an inorganic acid, such as, hydrochloric acid and sulfuric acid; an organic acid, such as, an organosulfonic acid, e.g., benzenesulfonic acid and p-toluenesulfonic acid, etc., and an organo-phosphoric acid; and cationic ion-exchange resin.

In carrying out the process according to the present invention an inorganic peroxide, such as, hydrogen peroxide, perborate, persulfuric acid, peroxymonosulfuric acid, ammonium persulfate, metal peroxides e.g., barium peroxide, sodium peroxide, etc., and an organic peroxide such as acetylperoxide, benzoyl peroxide, perbenzoic acid, etc., can be used. Further, all compounds that can form these peroxides in the reaction system can be also used.

In the process of this invention, the using ratio of the carboxylic acid to the alcohol as the raw material is preferably a stoichiometric ratio, but on considering the cost of each raw material, the ratio may be suitably changed.

By a preferred embodiment of this invention, if the inorganic acid catalyst is used, for example 0.2–0.5 mole of concentrated sulfuric acid to 1 mole of the carboxylic acid or the anhydride is added into the raw material, and if the organic acid catalyst is used, for example 0.01–0.02 mole of p-toluenesulfonic acid is added into the raw material together with for example about 0.2–1.5 mole, preferably 0.3–0.5 mole of 30% hydrogen peroxide as the peroxide in each case. By heating with refluxing the mixture, the esterification is finished in a short time.

By treating thus obtained reaction product by a conventional process, a desired carboxylic acid ester can be obtained with a yield of 75–100%.

The following examples are given to explain the process of this invention more in detail, but it should be understood that the invention is not limited to these examples.

Example 1

In the example, ethyl acetate was prepared;

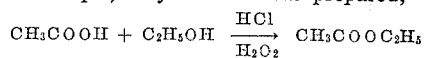

In a reaction having a reflux condenser were placed 60 g. of glacial acetic acid, 92 g. of ethyl alcohol, 10 ml. of 35% hydrochloric acid and 10 ml. of 30% hydrogen peroxide, and they were reacted for 5 minutes at 75–80° C. on a steam bath. After the reaction was finished, by treating the reaction liquid by a conventional method, 79.2 g. of the ester having a boiling point of 75–77° C. was obtained. The yield was 90%.

Example 2

Ethyl acetate was prepared as;

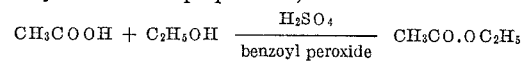

In a reaction flask equipped with a reflux condenser were placed 60 g. of glacial acetic acid, 92 g. of ethyl alcohol, 49 g. of concentrated sulfuric acid, and 2.4 g. of benzoyl peroxides. They were heated for 15 minutes in an oil bath at 130° C. and treated by a conventional method. By the treatment, 81.5 g. of the ester having a boiling point of 75–78° C. was obtained with a yield of 92.6%.

Similarly, the following esters were obtained from the corresponding raw materials by using the same inorganic acid catalyst and various peroxides.

*Example 24*

Dimethyl phthalate was prepared as;

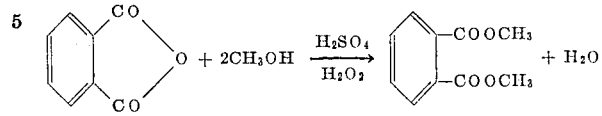

| Example | Compound | B.P. or M.P. (° C./mm.) | Peroxide used | Reaction time (min.) | Yield (Percent) |
|---|---|---|---|---|---|
| 3 | Methyl formate | 30–32 | $H_2O_2$ | 7 | 96.6 |
| 4 | Ethyl formate | 54–55 | $H_2O_2$ | 5 | 95.9 |
| 5 | Ethyl propionate | 98–100 | $H_2O_2$ | 5 | 78.6 |
| 6 | ----do---- | 98–100 | Benzoyl peroxide | 5 | 75.0 |
| 7 | Ethyl valerate | 134–136 | $H_2O_2$ | 6 | 88.5 |
| 8 | Methyl caprylate | 75/12 | $H_2O_2$ | 6 | 86 |
| 9 | Methyl caprate | 90–92/7 | $H_2O_2$ | 9 | 83.3 |
| 10 | Methyl laurate | 125/12 | $H_2O_2$ | 12 | 97.6 |
| 11 | Methyl myristate | 155/5 | $H_2O_2$ | 8 | 97.1 |
| 12 | Methyl palmitate | (M.P. 30) | $H_2O_2$ | 10 | 96.3 |
| 13 | Isoamyl acetate | 141–142 | Peracetic acid | 10 | 100 |
| 14 | Secondary butyl acetate | 110–111 | $H_2O_2$ | 12 | 100 |
| 15 | Isobutyl butyrate | 157 | Sodium perborate | 10 | 91 |

*Example 16*

Ethylene glycol dipropionate was prepared as;

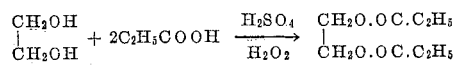

In a reaction flask having a reflux condenser were placed 22 g. of propionic acid, 6.2 g. of ethylene glycol, 2 g. of concentrated sulfuric acid, and 3 ml. of 30% hydrogen peroxide, and they were heated in an oil bath for about 15 minutes at 140–150° C. By treating the reaction product by a conventional method, 15.5 g. of the ester having a boiling point of 211–213° C. was obtained. The yield was 89%.

Similarly, the following esters were obtained from the corresponding raw material compositions by using hydrogen peroxide as the peroxide.

In a reaction flask having a reflux condenser were placed 1 mole of phthalic anhydride, 2.5 moles of methyl alcohol, 1 mole of concentrated sulfuric acid, and 0.3 mole of hydrogen peroxide and they were heated for 20 minutes in an oil bath at 85–95° C. When the content was homogenized, the reaction reached the end. After the reaction, by treating the reaction product with a conventional method, 184 g. of dimethyl phthalate having a boiling point of 138–140° C./8mm. Hg was obtained with a yield of 95%.

Similarly, the following esters were obtained from the corresponding compositions.

| Ex. | Compound | B.P. or M.P. (° C./mm. Hg) | Time (min.) | Yield (percent) |
|---|---|---|---|---|
| 25 | Dibutyl phthalate | 340 | 23 | 92 |
| 26 | Methyl benzoate | 98/30 | 20 | 100 [1] |
| 27 | Methyl salicylate | 120–121/30 | 25 | 96 |
| 28 | Phenyl salicylate | (M.P. 41–42) | 20 | 88 |
| 29 | Methyl p-nitrobenzoate | (M.P. 98) | 18 | 97.8 |
| 30 | Methyl cinnamate | (M.P. 34.5) | 15 | 96.9 |
| 31 | Isoamyl cinnamate | 148–152/35 | 20 | 90.8 |
| 32 | Benzyl cinnamate | (M.P. 38–39) | 18 | 98.5 |
| 33 | Tetrahydrofurfuryl benzoate | 139–140/2 | 20 | 89.5 |

[1] Catalyst: perbenzoic acid.

*Example 34*

Methyl benzoate was prepared as;

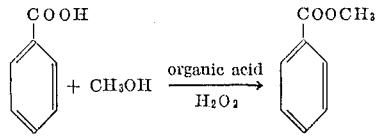

| Ex. | Compound | B.P. (° C./ mm. Hg) | Reaction time (min.) | Yield (Percent) |
|---|---|---|---|---|
| 17 | Benzyl acetate | 213–214 | 10 | 93 |
| 18 | Ethylene glycol. diacetate | 189–191 | 18 | 89 |
| 19 | Glycerol triacetate | 170/40 | 120 | 96.5 |
| 20 | Benzyl butyrate | 238–239 | 12 | 87.6 |
| 21 | Phenylethyl formate | 102–105/14 | 20 | 91 |
| 22 | Phenylethyl propionate | 210–212 | 15 | 86.9 |
| 23 | Furfuryl acetate | 176 | 8 | 98.1 |

In a reaction flask equipped with a reflux condenser were placed 12.2 g. of benzoic acid, 15 g. of methyl alcohol, 0.2 g. of p-toluenesulfonic acid, and 6 ml. of 30% hydrogen peroxide and they were heated for about 18 minutes in an oil bath at 130–140° C. By treating the reaction product by a conventional method, 13 g. of the ester having a boiling point of 98–99° C./30mm. Hg was obtained. The yield was 95.6%.

*Example 35*

Methyl iso-nicotinate was prepared as;

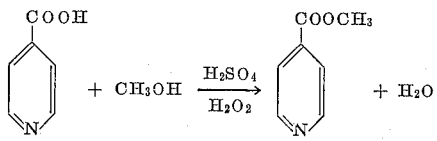

In a reaction flask equipped with a reflux condenser were placed 6.2 g. of isonicotinic acid, 4.8 g. of methyl alcohol, 9.8 g. of concentrated sulfuric acid and 3 ml. of 30% hydrogen peroxide. They were heated for about 20 minutes in an oil bath at 140° C. and treated by a conventional method to give 6.4 g. of the ester having a boiling point of 102–103° C./20 mm. Hg. The yield was 94%.

Similarly, the following esters were produced from the corresponding raw material compositions.

| Ex. | Compound | B.P. or M.P. (° C./mm. Hg) | Time (min.) | Yield (percent) |
|---|---|---|---|---|
| 36 | Ethyl furan-2-carboxylate | (M.P. 35.5–36) | 16 | 100 |
| 37 | Methyl 2-phenylquinolin-4-carboxylate. | (M.P. 51–52) | 15 | 91.5 |
| 38 | Isoamyl furan-2-carboxylate | 80–83/6 | 15 | 82.5 |
| 39 | Benzyl furan-2-carboxylate | 107–110/9 | 5 | 100 |
| 40 | t-Butyl thiophene-2-carboxylate | 63–65/16 | 8 | 91 |
| 41 | (2-Oxyethyl) thiophene-2-carboxylate | 80–84/8 | 8 | 94 |

*Example 42*

Ethylene glycol dipropionate was prepared as;

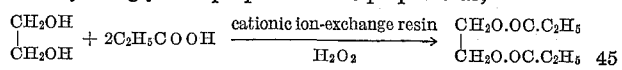

In a reaction flask having a reflux condenser were placed a mixture of 22 g. of propionic acid, 6.2 g. of ethylene glycol, 2 g. of a cationic ion-exchange resin (for example Amberlite IR120), and 3 ml. of 30% hydrogen peroxide, and they were heated for about 15 minutes in an oil bath at 140–150° C. and treated by a conventional method to afford 14.8 g. of the ester having a boiling point of 211–213° C. The yield was 85%.

Similarly, the following ester was obtained from the corresponding compositions.

Example 43:
  Compound _____ Glycerol triacetate
  B.P. (° C./mm. Hg) _____ 170/40
  Time (min.) _____ 70
  Yield (percent) _____ 80

What is claimed is:

1. In the process for the production of a carboxylic acid ester by the esterification of a carboxylic acid selected from the group consisting of aliphatic carboxylic acids, aromatic carboxylic acids, and heterocyclic carboxylic acids with an alcohol by heating the said carboxylic acid in the presence of a catalytic amount of a catalyst selected from the group consisting of inorganic acid catalyst, organic acid catalyst and cation-exchange resin catalyst, the improvement of adding peroxide to the reaction system in a mole ratio of peroxide to carboxylic acid of from 0.01 to 0.5:1.

2. The process as claimed in claim 1 wherein the peroxide is an inorganic peroxide.

3. The process as claimed in claim 2 wherein the inorganic peroxide is hydrogen peroxide.

4. The process as claimed in claim 2 wherein the inorganic peroxide is a perborate.

5. The process as claimed in claim 2 wherein the inorganic peroxide is a member of the group of alkali metal and alkaline earth metal peroxides.

6. The process as claimed in claim 2 wherein the inorganic peroxide is ammonium persulfate.

7. The process as claimed in claim 2 wherein the inorganic peroxide is a persulfuric acid.

8. The process as claimed in claim 1 wherein the peroxide is an organic peroxide.

9. The process as claimed in claim 8 wherein the organic peroxide is benzoylperoxide.

10. The process as claimed in claim 8 wherein the organic peroxide is acetylperoxide.

11. The process as claimed in claim 8 wherein the organic peroxide is perbenzoic acid.

References Cited

UNITED STATES PATENTS 2,871,103  1/1959  Skinner _____ 23—207
3,190,904  6/1965  Spoors et al. _____ 260—453

FOREIGN PATENTS 739,609  11/1955  Great Britain.

OTHER REFERENCES

Subrahamanyam et al.: J. Am. Oil Chemists Soc., vol. 41, pp. 275–9, abstracted in Chem. Absts., vol. 61, col. 848–9.

ALEX MAZEL, *Primary Examiner.*

DONALD G. DAUS, *Assistant Examiner.*